United States Patent
Namm et al.

(10) Patent No.: US 9,137,645 B2
(45) Date of Patent: Sep. 15, 2015

(54) APPARATUS AND METHOD FOR DYNAMIC CALL BASED USER ID

(75) Inventors: Joseph C. Namm, Plantation, FL (US); Michael N. Weidner, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 158 days.

(21) Appl. No.: 13/485,264

(22) Filed: May 31, 2012

(65) Prior Publication Data

US 2013/0324095 A1    Dec. 5, 2013

(51) Int. Cl.
*H04M 3/42* (2006.01)
*H04B 7/00* (2006.01)
*H04M 1/66* (2006.01)
*H04W 4/10* (2009.01)
*H04L 29/06* (2006.01)

(52) U.S. Cl.
CPC ............... *H04W 4/10* (2013.01); *H04L 65/403* (2013.01)

(58) Field of Classification Search
CPC ............................ H04M 3/56; H04M 2207/18
USPC ........................................................ 455/416
See application file for complete search history.

(56) References Cited

U.S. PATENT DOCUMENTS

| | | |
|---|---|---|
| 7,221,290 B2 | 5/2007 | Burgemeister |
| 7,684,554 B1 * | 3/2010 | Vincent et al. ............ 379/220.01 |
| 2003/0040314 A1 * | 2/2003 | Hogan et al. .................. 455/435 |
| 2006/0095473 A1 * | 5/2006 | Fox ............................. 707/104.1 |
| 2006/0135123 A1 * | 6/2006 | Jo ................................. 455/410 |
| 2008/0045256 A1 * | 2/2008 | Wang et al. .................... 455/518 |
| 2008/0235334 A1 * | 9/2008 | Gupta et al. ................... 709/206 |
| 2009/0111392 A1 * | 4/2009 | Taylor .............................. 455/88 |
| 2009/0143114 A1 * | 6/2009 | Vargas et al. .................. 455/574 |
| 2010/0119045 A1 * | 5/2010 | Caputo et al. ............. 379/88.01 |
| 2011/0177829 A1 * | 7/2011 | Platt et al. .................. 455/456.2 |

* cited by examiner

*Primary Examiner* — Lester Kincaid
*Assistant Examiner* — Andy Gu
(74) *Attorney, Agent, or Firm* — Barbara R. Doutre

(57) ABSTRACT

A dynamic call based user ID allows subscriber units to be shared amongst a plurality of users or used for a plurality of roles/uses. A voiced call sign is transmitted by a calling subscriber unit to a targeted subscriber unit. A pattern in the voice transmission of the calling unit is detected, and the voiced call sign is compared to a list of pre-stored call signs. When a match between stored calls signs and the current call sign occurs, the calling subscriber unit saves the current call sign. Fixed network equipment (FNE) then associates the saved current call sign with a subscriber unit ID (SUID) of the calling unit. The dynamic association between the call sign and the SUID allows the subscriber unit to be shared amongst different users and for different uses/roles.

15 Claims, 4 Drawing Sheets

APPARATUS AND METHOD FOR DYNAMIC CALL BASED USER ID

TECHNICAL FIELD

The technical field relates generally to a wireless communication system, and more particularly, to an apparatus and method for using a spoken call sign as a subscriber ID, so that subscriber units can be shared amongst different users and users can assume different roles.

BACKGROUND

Wireless communication systems are heavily relied upon by public safety agencies, such as police departments, fire departments, and emergency rescue operations, to name a few. In the public safety arena, wireless communication systems are typically embodied as two-way radios operating in either a trunked mode of operation or a conventional mode of operation. In trunked systems, a limited number of communication channels are shared/switched amongst a much larger number of subscribers, via an infrastructure of repeaters and base stations, to facilitate efficient use of the system's communication resources. In conventional systems, which typically have fewer subscriber units than trunked systems, a number of communication channels are shared amongst a number of subscribers using one or more dedicated talkgroups, without the use of switching controls in the infrastructure.

In both trunked and conventional systems, portable two-way radios, also referred to as subscriber units, are provisioned with a unique user ID and talkgroup. The user ID identifies an individual or a role that may be performed by one or more individuals. User ID provisioning can be challenging when there are more users than radios within the system as well as anytime a user changes subscriber units or roles. As for the provisioning of talkgroups, when a group call targets a specific user of a talkgroup (for example "Command calling Engine 20," there is no current means of ensuring that the targeted radio received the group call, or to know if the user of the targeted radio heard the call. Furthermore, when a group call targets a specific user of a talkgroup, there is no current means of determining whether the user is on a wrong channel or a different channel. These challenges encountered with user ID provisioning and talkgroup allocation make it difficult for subscriber units to be shared or for the user of a subscriber unit to assume a different role.

Accordingly, there is a need for an improved communication system that enables subscriber units to be shared amongst different users and allows users to assume different roles.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
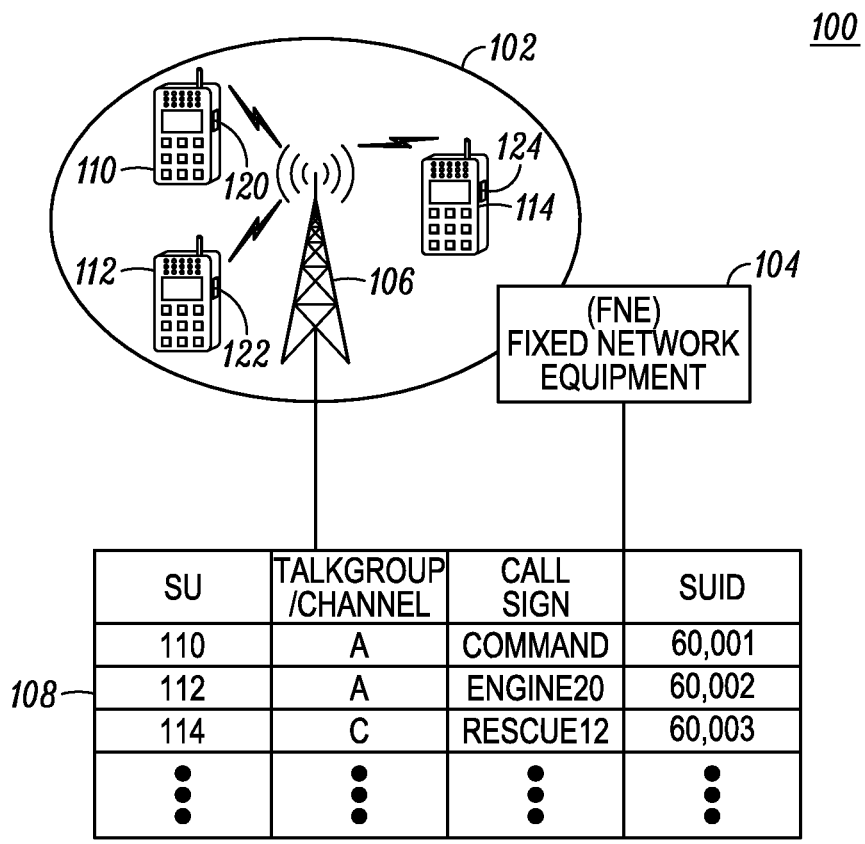
FIG. 1 is a diagram of a communication system operating in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Briefly, in accordance with the various embodiments, a method and system for using a spoken call sign as a subscriber ID is provided. For the purposes of this application, the following terms are defined: a spoken call sign is defined as: spoken words which identify a current user and/or a current use of a calling subscriber unit; a subscriber unit ID (SUID) is defined as a unique number used to universally identify a specific subscriber unit; and a talkgroup is defined as a logical channel used for communicating with a group of subscriber users. In accordance with the various embodiments, the spoken call sign allows subscriber units to be shared amongst different users and allows the users to assume different roles, without having to reprovision IDs or subscribers within a communication system. Those skilled in the art will realize that the above recognized advantages and other advantages described herein are merely illustrative and are not meant to be a complete rendering of all of the advantages of the various embodiments.

FIG. 1 shows a communication system 100 operating in accordance with the various embodiments. Operating within a communication site 102, such as an incident area, are subscriber units 110, 112, 114, such a portable two-way radios 110, 112, 114, and infrastructure devices, such as tower 106 operating as part of a fixed network equipment (FNE) 104. For the purposes of this application, infrastructure devices may comprise servers, base stations, base transceiver stations, or any other type of infrastructure equipment interfacing a wireless subscriber unit via simplex communication links for two-way radio communication.

Communication system 100 may be a trunked system or a conventional system, providing two-way radio communication over any frequency band appropriate for public safety communication. For example, system 100 may operate within a very high frequency (VHF) band (about 136-174 MHz), an ultra high frequency (UHF) band (about 380-520 MHz), and a 7/800 MHz band (about 764-869 MHz). Other bands could also be desirable, for instance a global positioning system (GPS) band (about 1565-1585 MHz) or a long-term evolution (LTE) public-safety band (about 758-798

MHz). The plurality of subscriber units are assigned to one or more talkgroups, for example talkgroup A, talkgroup B, talkgroup C, etc. For example, a Table 108 provides an example of subscriber units 110, 112 being assigned to talkgroup A while subscriber unit 114 is assigned to talkgroup C.

Subscriber units 110, 112, 114 each have a respective PTT switch 120, 122, 124, and the PTT is used to initiate a call. During "targeted" group calls (group calls in which a single user is talking to another single user) the voice transmission contains the calling user call sign followed by the targeted user call sign or simply the targeted user call sign alone. Thus, in a group call, such as "Command to Engine 20" the word "Command" identifies the calling user and the words "Engine 20" identify the targeted user. The call signs used throughout the communication system 100 are all known and programmed within the communication system.

When a PTT of a subscriber unit is pressed, a check is made to determine whether a speech pattern indicating a voiced call sign entry is detected. The check determines whether a "unit-to-unit" pattern or "unit" pattern is detected, as opposed to some other conversational pattern. The speech pattern may be detected with speech recognition programmed for various call sign unit-to-unit and unit patterns.

In accordance with the various embodiments, a pre-configured list of call signs are stored in a memory, the memory being located either in each subscriber 110, 112, 114 and/or within the system controller of FNE 104. The list is also pre-configured list may be further configured as call signs may be voiced into the subscriber units by the users of the communication system 100.

When the voiced call sign pattern is detected (as opposed to other voiced communication, such as conversation), the actual call sign is then compared to phonetic representations of the stored call signs within the list. When a match occurs between the voiced call sign and one of the stored call signs, then the calling user's current call sign (e.g. "Command") is established in the system. For example, calling subscriber unit 110 can be established with its current call sign "Command." The second call sign match is determined to be the unit being called (e.g. "Engine 20"). If only one call sign is detected in the voice sample, that call sign is determined to be the unit being called (e.g. "Engine 20").

In accordance with the various embodiments, the current call sign is then associated to the subscriber unit by dynamically associating the current call sign to the subscriber unit ID (SUID). The dynamic association occurs by saving the current call sign with the associated SUID at the FNE 104. The SUID is a unique ID for each subscriber unit. By associating the current call sign with the SUID in the system FNE 104, the system can now perform operations when the subscriber unit 110 is being addressed verbally by any other unit in the system.

Once the call is established, the targeted subscriber unit receives the voice call. The received voice call is sampled during the initial seconds by the targeted unit to detect either a unit-to-unit or unit speech pattern. Upon detection of a unit-to-unit or unit speech pattern, the sample is further compared to stored call signs (stored as phonetic representations of the spoken words) to determine the call sign of the unit being called. Once the targeted subscriber unit's call sign is established, the call sign can be used to determine when another subscriber unit is targeting it in a group voice call.

By way of example, a call amongst the devices of system 102 will be described. To initiate a call in talkgroup A from subscriber unit 110, the PTT switch 120 of subscriber unit 110 is pressed, and a group call voice transmission is started identifying that the subscriber unit 112 is the target. Everyone else within the talkgroup A will also hear that subscriber unit 112 is the target radio for the call. The voice transmission of subscriber unit 110 is checked to determine whether a "unit-to-unit" pattern or "unit" is detected at the beginning of the voice transmission. For example, the pattern for "Command to Engine 20" or "Engine 20".

When a speech pattern indicating a call sign is detected, then the call sign is compared to the preconfigured list of call signs, stored in either the subscriber 110 itself or the FNE 104. For example, depending on the calling protocol, an adaptable method can be used to determine the encoding unit sound byte.

When a pattern is detected indicating a call sign, and the call sign matches one from the list of call signs, the calling subscriber unit 110 establishes the call with subscriber unit 112 and also saves the current call sign, to the subscriber unit itself 110.

In accordance with the various embodiments, the call sign (e.g. Command) is then associated to the subscriber unit 110 by dynamically associating the current call sign of subscriber unit 110 to the subscriber unit ID (SUID) of subscriber unit 110. The dynamic association occurs by saving the current call sign (e.g. saving the call sign "Command") with the associated SUID at the FNE 104. Again, the SUID is a unique ID for each subscriber unit. By associating the current call sign with the SUID in the system FNE 104, the system can now perform operations when that subscriber unit 110 is being addressed verbally by any other unit in the system.

After the SU 112 is determined to be targeted, it can alert the user of subscriber unit 110 if the call is unanswered. For example, if a group call voice transmission is received by subscriber unit 112, the voiced transmission received by subscriber unit 112 is checked to detect either a "unit-to-unit" pattern or a "unit" pattern at the beginning of the transmission. Depending on the calling protocol, a configurable method can be used to determine the decoding unit sound byte.

If a speech pattern is detected by subscriber unit 112, then a check is made to determine whether a unit match with the currently established subscriber call sign is received. The unit match check is based on the saved call sign stored within subscriber 112. If a unit match is received at subscriber unit 112, then subscriber unit 112 acknowledges receipt of the call. The encoding unit of subscriber unit 112 and the FNE 104 now know that a call was received and decoded.

The audio received at subscriber unit 112 is buffered and a user response timer (URT) is started. The buffering and timer may be handled by either the subscriber unit 112 or the FNE 104. If the user response timer of subscriber 112 times out before the user responds to the call then an audible and/or visual indication can be made to the user of subscriber unit 112 to indicate a missed call. The user of subscriber unit 112 can either respond to the call or replay the buffered audio.

When a group call, say from subscriber unit 110 to subscriber unit 112, results in a missed call, then the FNE 104 checks to determine whether the targeted subscriber 112 is registered on the system. This check is performed by the FNE 104 by associating the current call sign of subscriber unit 110 with the subscriber unit ID for the subscriber unit 112.

If the targeted SU 112 is registered on a communication system, then the FNE 104 sends an alert to the targeted SU 112 to warn the targeted SU 112 that it is missing a group call. The targeted subscriber unit 112 will then be patched in to the appropriate talkgroup or regrouped as appropriate. The call can is thus established.

Example of the Same User of SU 110 Changing Roles.

In accordance with the embodiments, when the current user of subscriber unit 110 wishes to change roles, he/she presses the PTT 120 and enters a new call sign. For example, rather than entering call sign "Command" the same user might enter "Rescue 12." The saved speech pattern (saved from the voiced Command entry) allows the radio to be reassigned to Rescue 12, and now the call sign for the radio 110 is established as Engine 12. The SUID for radio 110 is now dynamically associating to the call sign Engine 12. Thus, the same user is able to change roles while retaining use of the same radio.

Example of Different User Using the Save Subscriber Unit 110

In accordance with the embodiments, when another user wishes to use subscriber 110, that new user presses PTT 120 and enters his/her call sign, and this voiced call sign is checked on the list for pattern detection and matching. If a match to the voice pattern is detected then the call is established with the new user. Thus, different users can are able to use the same subscriber unit.

Accordingly, the ability to dynamically associate a call sign to an SUID advantageously allows for non-static mapping which allows a subscriber unit to be used by many users and under many roles.

Figure 2:
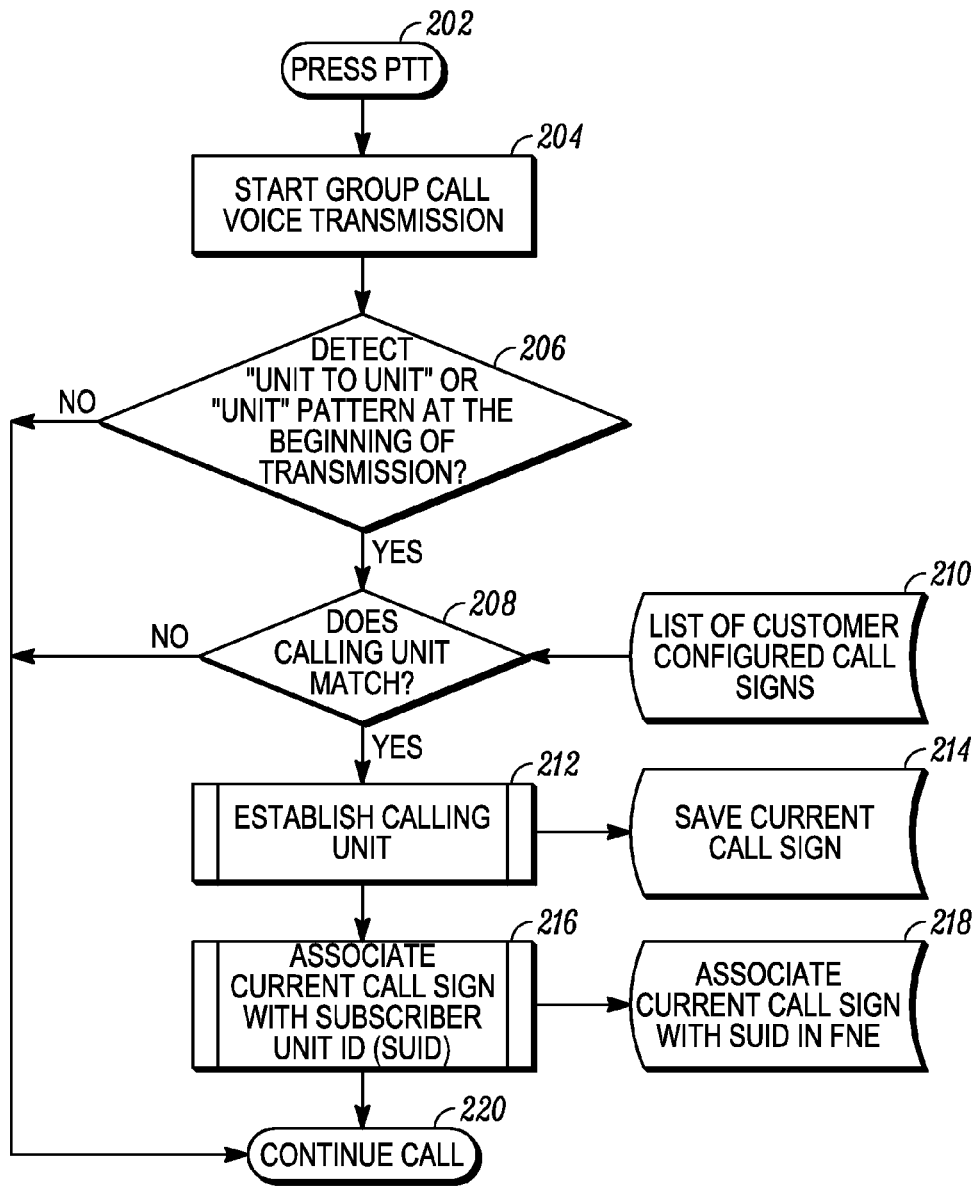
FIG. 2 is a flow diagram of a method for establishing a call using a call sign in accordance with the various embodiments.

FIG. 2 is a flow diagram of a method 200 for encoding a call and establishing a call using a call sign in accordance with the various embodiments. In accordance with the various embodiments, the subscriber unit call sign is established based on current user (e.g. Command) and on current use case (e.g. Command calling Engine 20). Beginning at 202, a subscriber unit's PTT is pressed, and a group call voice transmission is started at 204. For example SU 110 is pressed at PTT 120. At 206, the voice transmission is checked to determine whether a predetermined pattern, such as a "unit-to-unit" pattern (e.g. Command calling Engine 20) or "unit" pattern (e.g. Engine 20) is detected. Patterns may be detected using speech pattern recognition known in the art. If no pattern is detected at 206, the call still continues at 220, however the call will continue without establishing the SU 110 based on its call sign.

When a predetermined speech pattern is detected at 206, the SU is checked at 208 for a match to a preconfigured list of call signs 210. For example, SU 110 is checked for a match to a preconfigured list of call signs stored within its memory. The pre-configured list may have been entered by the customer, a service shop, or other entity familiar with the operation and assignment of the subscriber units within the system. For example, the voiced entry of call sign "command" into SU 110 would be compared to the preconfigured list to determine if the call sign "command" is on the list. If no match is detected at 208, the call still continues at 220, however the call will continue without establishing or reestablishing the SU 110 based on its call sign.

When a match is determined at 208, the unit is established with the current voiced call sign. Establishing the calling unit is accomplished by saving the matched voice call sign internally to the calling radio itself. For example, if a match occurred at 208, SU 110 would save the call sign "command" to its memory. Once established, the call sign can subsequently be used by the SU to determine when its user is being called. For example, SU 110 can determine if it is being targeted (called) based on the currently saved call sign.

The call sign is then associated at 216 with the subscriber unit ID (SUID). This association occurs by saving the current call sign associated with the SUID at the FNE 104. As discussed previously, the SUID is a unique ID for each subscriber. By associating the SUID to the voice ID in the system FNE, the system can now perform operations when that unit is being addressed verbally by any other unit in the system.

By repeating the steps of FIG. 2, different voiced call signs can be established as a current call sign for a subscriber unit. The various current call signs being dynamically associated with the SUID of the calling subscriber unit enables the calling subscriber unit to be shared by a plurality of users and for a plurality of uses.

Figure 3:
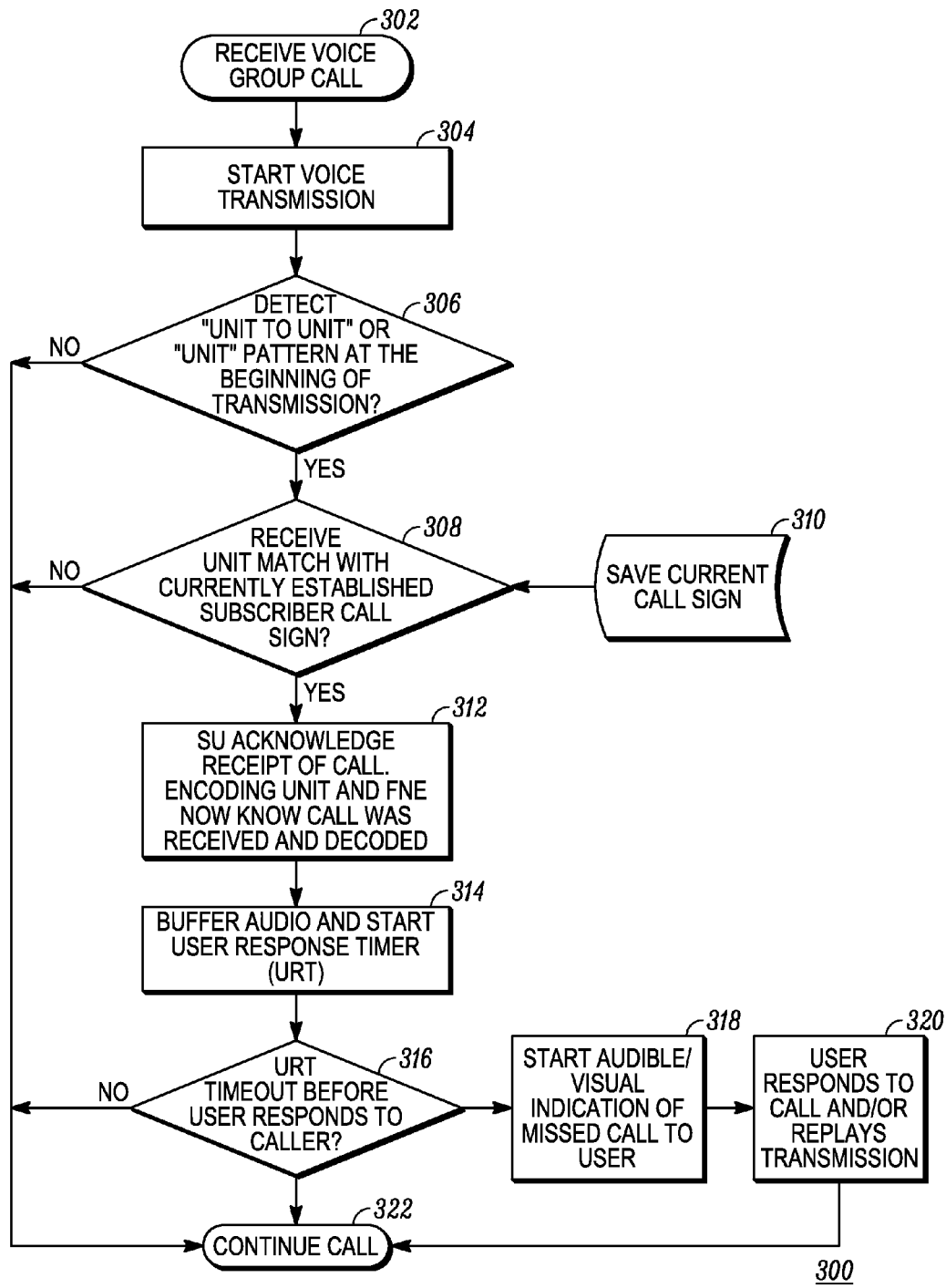
FIG. 3 is a flow diagram continuing the method of FIG. 2 with a method for detecting a targeted subscriber unit in accordance with the various embodiments.

FIG. 3 provides a flow diagram for a method 300 for detecting the addressed subscriber of FIG. 2 with the call sign, in accordance with the various embodiments. After an SU is determined to be targeted, the targeted SU can alert the user if the call is unanswered.

Beginning at 302 a group call is received and voice transmission begins at 304. At 306, the received voice transmission is checked to detect either a "unit-to-unit" pattern or a "unit" pattern at the beginning of the transmission. For example, SU 112 may detect a pattern for "Engine 20." Depending on the calling protocol, speech recognition can be used to provide a configurable method that decodes sound bytes at the receiving/targeted subscriber unit. If no pattern is detected at 306, the call still continues at 322, however the call will continue without saving the current call sign.

When a pattern is detected at 306, then a check is made to determine at 308 whether a unit match between the unit's previously established subscriber call sign and the current call sign, based on preconfigured list 310. If no unit match is detected at 308, the call still continues at 322, however the call will continue without saving the current call sign or any acknowledgment that the call was received.

When a unit match is determined at 308, then the targeted SU acknowledges receipt of the call at 312. Thus, the calling unit (encoding unit) and the FNE are aware that a call was received and decoded by targeted subscriber unit. For example the calling unit (encoding unit) 110 and the FNE 104 are aware that a call was received and decoded by SU 112.

Following the acknowledgement at 312, the received audio is buffered and a user response timer (URT) is started at 314. If the user does respond prior to the timeout timer expiring at 316 then the call is made with the calling unit. If the user response timer times out before the targeted user responds to the call at 316, then an audible and/or visual indication can be made to the user at 318 to indicate a missed call to the targeted user. At 320, the user can then respond to the call and/or replay the transmission. Otherwise, the call proceeds as established at 322.

Figure 4:
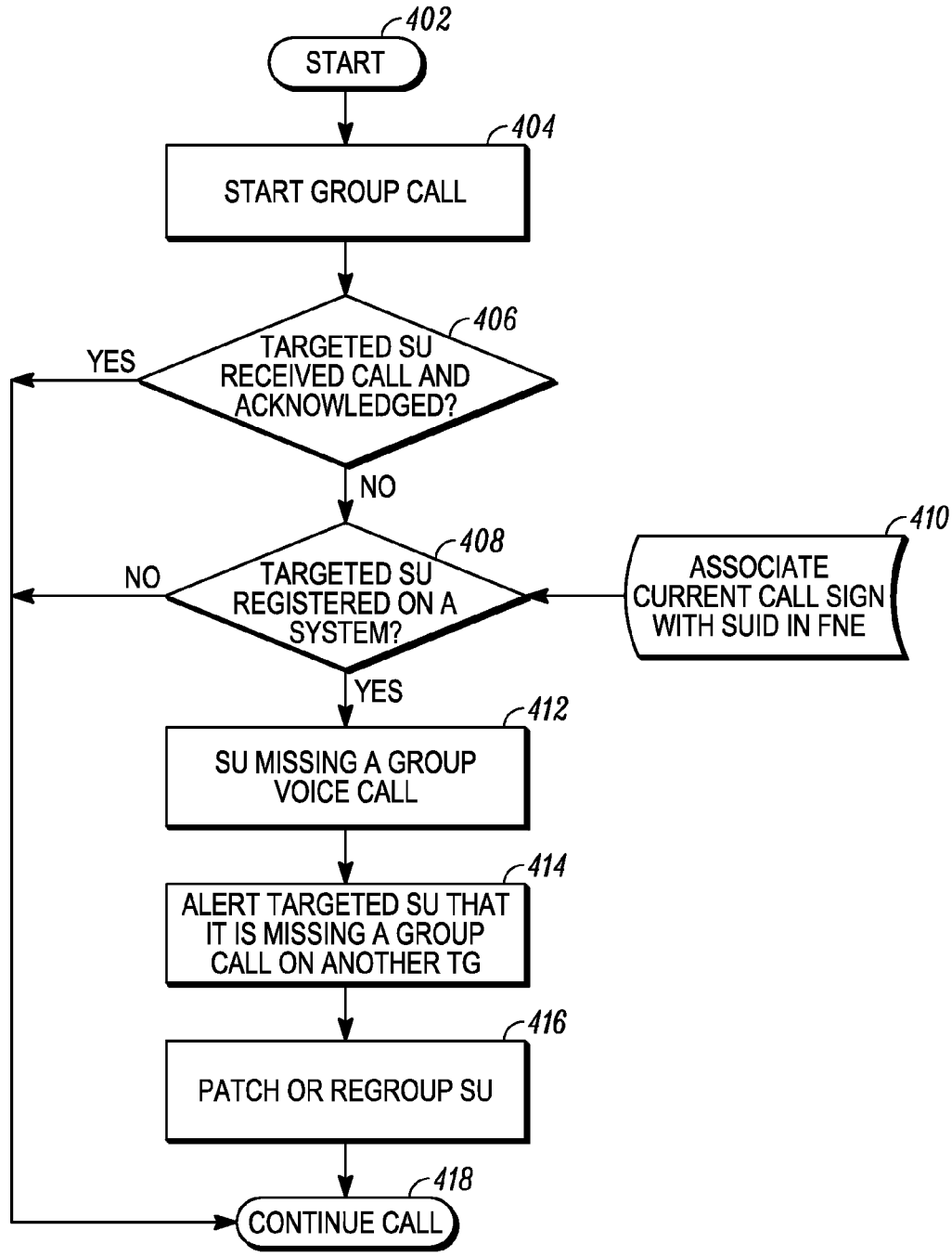
FIG. 4 is a flow diagram continuing the method of FIG. 3 with a method for locating an unresponsive user in accordance with the various embodiments.

At FIG. 4, a method 400 is provided which continues the method of FIG. 3 but further provides locating an unresponsive user in accordance with the various embodiments. Beginning at 402, a group call is started at 404, as from FIGS. 2 and 3. A check is made at 406 to determine if the targeted SU received a call and acknowledged it (via method 300). If the call was received and acknowledged then the call continues at 418.

If a determination is made at 406, that the call was not received or not acknowledged, then a check is made at 408 to determine whether the SU is registered on a communication system. This check is performed by the FNE at 410 by associating the current call sign with the SUID for the targeted SU. If the targeted SU is determined not to be on a system at 408, then the method proceeds to 418 where the call continues without the target unit. The group call does not need the availability of the target to continue.

If the targeted SU is registered on a system at 408, then the targeted SU has indeed missed a group voice call, and an alert is sent at 414 from the FNE to the targeted SU to warn the targeted SU that is missing a group call on another talkgroup. The targeted SU will then be patched in to the appropriate talkgroup or regrouped as appropriate at 416. For example regrouped to another talkgroup. The call can then continue at 418 with the targeted SU participating.

Accordingly, there has been provided an apparatus and method for using a spoken call sign as a subscriber ID, so that subscriber units can be shared amongst different users and users can assume different roles, without having to reprovision IDs or subscribers. The dynamic, non-static mapping of the call signs allows a subscriber unit to be used by many users and under many roles. As the call signs of the present disclosure are not fixed to specific SUIDs, each subscriber is able to associate itself dynamically to a configured call sign. Subscribers can change their call sign. The ability for a user to change their call sign enables different users to use the same subscriber unit and also that a user can change roles. The method of dynamic call based user ID allows for detecting when a subscriber is called by a call sign. The ability to indicate when a user misses a call and the ability to locate a user when a call is missed further improves safety within the communication system. The automatic patching of a subscriber unit, automating steering of a subscriber unit, and alerting of the subscriber unit on another channel all provide for improved safety for the subscriber users within the system.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talkgroup described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talkgroup described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for a group call in a communication system, the method comprising:
   initiating a group call voice transmission in response to a trigger being pressed at a calling subscriber unit;
   in response to initiating the call, detecting a speech pattern including a voice call sign in the group call voice transmission, wherein the voice call sign identifies a current user and a current use of the calling subscriber unit;
   comparing the detected voice call sign to a list of pre-stored voice call signs to determine that the detected voice call sign matches at least one in the list of pre-stored voice call signs;
   in response to determining a match, saving the detected voice call sign as the current voice call sign at the calling subscriber unit;
   associating the current voice call sign of the calling subscriber unit with a subscriber unit ID (SUID) at a Fixed Network Equipment (FNE), the FNE being an infrastructure element of the communication system;
   and initiating another group call by a different user using the same subscriber unit based on a second pre-stored voice call sign.

2. The method of claim 1, wherein detecting the voice call sign comprises detecting a speech pattern in the group call voice transmission, the speech pattern being either a subscriber unit-to-subscriber unit pattern or a subscriber unit pattern.

3. The method of claim 1, wherein the list of pre-stored voice call signs comprises a configurable list stored in either the calling subscriber unit or the FNE.

4. The method of claim 1, wherein the list of pre-stored voice call signs comprise phonetic representations of the voice call signs and the comparing comprises comparing the detected voice call sign to phonetic representation of stored voice call signs within the list of pre-stored call signs.

5. The method of claim 1, further comprising:
   changing to a different call sign to establish a new call using the same calling subscriber unit having the same SUID.

6. The method of claim 1, further comprising:
   receiving the group call voice at a targeted subscriber unit;
   detecting the speech pattern including a voice call sign in the voice transmission at the targeted unit;
   determining, in response to the speech pattern being detected, when the detected voice call sign matches a current voice call sign of the targeted subscriber unit;
   acknowledging receipt of the call by the targeted unit in response to determining a match between the current voice call sign and the detected voice call sign;
   buffering audio received by targeted unit;
   responding to the call by the targeted subscriber unit; and
   alerting the targeted unit if the call is being missed.

7. The method of claim 6, further comprising:
   in response to the targeted unit being alerted to the call that is being missed, patching or regrouping the targeted unit with the calling unit to establish the call.

8. A communication system, comprising:
   a plurality of subscriber units comprising at least one calling subscriber unit (SU) and at least one targeted subscriber unit (SU) communicating via talkgroups, wherein the at least one calling SU is configured to
   initiate a group call voice transmission in response to a trigger being pressed at the at least one calling SU,
   detect a speech pattern comprising a voice call sign in the group call voice transmission,
   compare the voice call sign to a list of pre-determined voice call signs to determine that the detected voice call sign matches at least one in the configurable list of voice call signs,
   save the voice call signs as the current voice call sign in response to determining a match; and
   a fixed network equipment (FNE) configured to dynamically associate the current voice call sign to a subscriber unit ID (SUID), such that different current voice call signs can be associated with the SUID, thereby enabling the calling subscriber unit to be shared by a plurality of users and for a plurality of uses; and
   wherein the at least one calling SU is further configured to initiate another group call by a different user using the same subscriber unite based on a second pre-stored voice call sign.

9. The communication system of claim 8, wherein the at least one calling SU detects the speech pattern using speech recognition to determine a subscriber unit pattern or a subscriber unit-to-subscriber unit pattern.

10. The communication system of claim 9, wherein the configurable list of voice call signs comprises phonetic representations of voice call signs and the detected voice call sign is compared to the phonetic representations to detect a match.

11. The communication system of claim 10, wherein if more than one voiced call sign match occurs, the first voiced call sign is established as the call sign of the at least one calling SU.

12. The communication system of claim 11, wherein if more than one voiced call sign match occurs, the second call sign match is determined to be the at least one targeted SU.

13. The communication system of claim 10, wherein if only one call sign match is detected in the voice sample, that call sign is determined to be the at least one targeted SU.

14. The communication system of claim 8, wherein the calling SU is alerted when a call is missed by the targeted SU.

15. The communication system of claim 14, wherein the targeted subscriber is patched or regrouped by the FNE to wirelessly connect the targeted SU to the calling SU when the calling SU is not affiliated to the same talkgroup.

* * * * *